United States Patent Office 3,709,789
Patented Jan. 9, 1973

3,709,789
BIOCHEMICAL ALDOSTERONE SYNTHESIS
Eiji Kondo, Ikeda, Takashi Mitsugi, Senboku-gun, and Kazuo Tori, Kobe, Japan, assignors to Shionogi & Co., Ltd., Osaka, Japan
No Drawing. Application Jan. 13, 1969, Ser. No. 790,834, now Patent No. 3,631,031, which is a continuation-in-part of abandoned application Ser. No. 555,220, June 6, 1966. Divided and this application Feb. 16, 1971, Ser. No. 115,842
Claims priority, application Japan, June 11, 1965, 40/34,820, 40/34,821, 40/34,822
Int. Cl. C07c 167/00
U.S. Cl. 195—51 R    10 Claims

ABSTRACT OF THE DISCLOSURE

Corticosterone or esters thereof is treated with the enzymes of Corynespora fungus to obtain novel 18-hydroxycorticosterone inter- and/or intra-molecular acetals and/or acylates thereof accompanied with several monohydroxycorticosterones, then the product is treated with acid or mixture of acid and acylating agent to form ether bridge between positions 11 and 18, finally the 18-deoxyaldosterone derivatives obtained are treated again with the enzymes of Corynespora fungus to prepare aldosterone, 18-dehydroaldosterone, 9α-hydroxy-11β,18-epoxy-4-androstene-3,17-dione.

---

This application is a division of application Ser. No. 790,834, filed Jan. 13, 1969, now U.S. Pat. No. 3,631,031, which is a continuation-in-part of Ser. No. 555,220, filed June 6, 1966, now abandoned.

The present invention relates to a novel improvement in aldosterone synthesis. More particularly, it relates to a simple and short synthesis of aldosterone from corticosterone through novel intermediates by the application of unique biochemical hydroxylation reactions acting at the 18-position of steroid nucleus by the utilization of a microorganism belonging to Corynespora genus.

Several investigations dealing with the partial synthesis of aldosterone have been reported in recent years. However, the practical use of microorganisms in the course of aldosterone synthesis has not been reported so far. The present invention provides a novel course consisting of only three steps including two microbiological 18-hydroxylation reactions.

The first step comprises enzymatical hydroxylation of 18-position of corticosterone (1:R'=H) or an enzymatically acceptable acylate thereof (1:R'=acyl) by the action of enzymes produced by a Corynespora fungus, other mono-hydroxylated corticosterones such as 6β-, 8β-, 14α-, 15β- and 17α-hydroxycorticosterones being usually by-produced in relatively low yields.

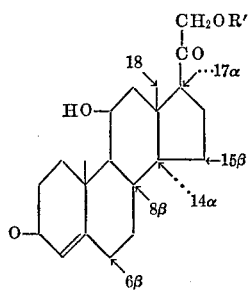

(1)

Hydroxylation of corticosterone (1) by Corynespora fungus

On the thin-layer chromatogram of the reaction mixture, the present inventors have found a spot which is assumed to be that of 18-hydroxycorticosterone of the formula:

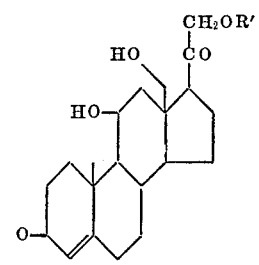

(2)

or 18,20-hemiketal thereof. However, the spot disappears during process of isolation and the main product obtained was the dimer of the formula:

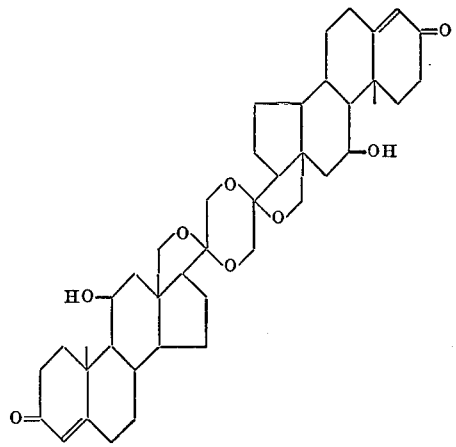

(3)

accompanied with small amounts of several types of dimeric 18-hydroxycorticosterone. As all of the dimers are utilized as convenient sources of the second step, the isolation of the 18-hydroxycorticosterone (2) is not indispensable for the process of this invention. The dimer (3) is the most easily susceptible of the reaction of the second step, and other dimers may be converted into compound (3) prior to the reaction of the second step.

The novel dimeric compound (3) could not be converted into the corresponding monomeric substance in functionally free state, however, it has been successfully converted into the monomeric form by the action of an alkylating agent or ketalating agent in the presence of an acid followed by, if required, acylation. The novel 18,20-hemiketal compounds of the invention are represented by the following generic formula, wherein R solely represents a lower alkyl, R' solely represents a hydrogen atom or a lower alkanoyl, and R and R' combined together represent a lower alkylidene or another molecule of the same 18 - hydroxy-corticosterone 18,20 - hemiketal ($C_{21}H_{28}O_3$) moiety (e.g. compound (3)):

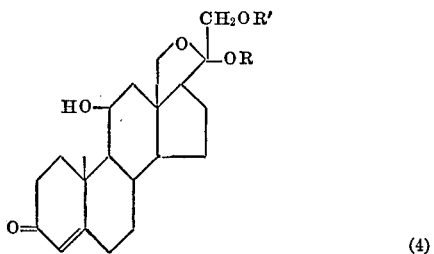

(4)

The second step is 11,18-ether bridge formation. As is represented by the following reaction scheme, wherein R and R' have the same significances as designated above, one of the 18-hydroxycorticosterone 18,20-hemiketal compounds (4, including 3) is treated with an acid or a mixture of an acid and an acylating agent of enzymatically acceptable acylates thereof (5) in nearly quantitative yield. In some cases, when the reaction medium is under oxidative atmosphere such as air or oxygen, a small amount of 11β,18-dihydroxy-4-androstene-17β-carboxylic acid 18,20-lactone (6) in which the carbon atom 21 is oxidatively eliminated, is produced, while production of this compound may completely be avoided by replacement of the oxidative atmosphere with an inert gas such as nitrogen or carbon dioxide.

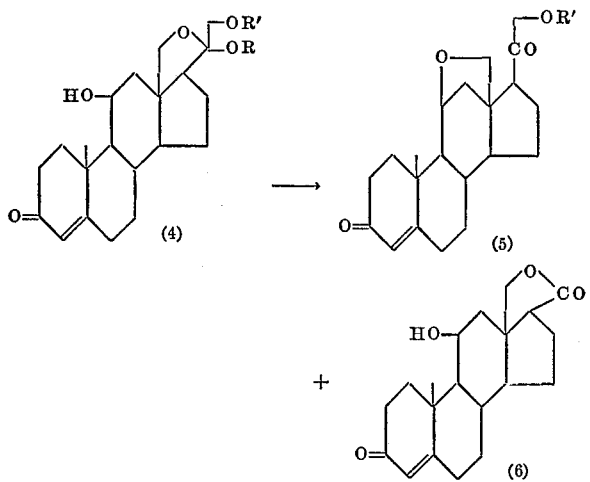

The third step comprises, as is represented by the following reaction scheme wherein R' has the same significances as defined above, treating 18-deoxyaldosterone or an enzymatically acceptable 21-acylate thereof (5), with the enzymes of a Corynespora fungus, for production of aldosterone (7). The reaction generally accompanies production of small amounts of further oxidized products such as 18-dehydroaldosterone (8) and/or 9α-hydroxy-11β,18-epoxy-4-androstene-3,17-dione (9). 18-dehydroaldosterone can be converted to aldosterone by the known process (e.g. Reichsterin et al., Helv. Chim. Acta, 38, 1423 (1955)).

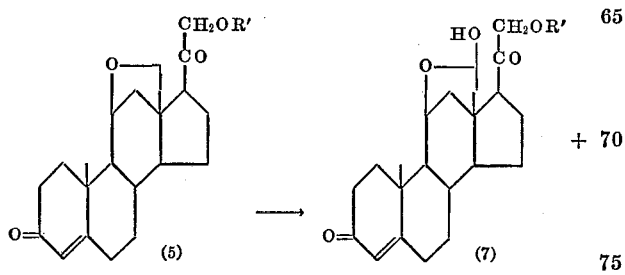

etc.

As to the Corynespora fungus being used in the present process, especially in the first and third steps, any strains belonging to this genus can be used, however, C. cassiicola or C. melonis is preferable. The propagation of this fungus may be carried out in the usual manner in an optional nutrient medium, for example, an aqueous liquid medium consisting of a carbon source such as glucose, a nitrogen source such as peptone and minor growth factors contained corn steep liquor.

The biochemical reaction in the first step or third step is carried out by contacting the substrate with the enzymes of the fungus in a nutrient deficient medium, more preferably a nutrient-lacking medium such as water or simple salt solution of appropriate osmotic pressure at enzymatically optimum temperature, preferably about 15–40° C., for about 1–5 days. As to the enzymes, any materials of Corynespora fungus occurrence can be applied. Among these materials so-called resting mycelium is most convenient. Thus the previously propagated mycelium of the fungus is, if required with previous washing; admixed directly with the substrate solution in the medium and is involved in the reaction.

It should be noted that 18-hydroxylation of corticosterone by a microorganism is novel and moreover 18-hydroxylation of 18-oxidized steroid (18-deoxyaldosterone-18-hydroxycorticosterone 11,18-ether) is a remarkable feature in the art. It should be further noted that the present process comprises a remarkable feature in that the same microoragnism is used in two different steps in the course of the synthesis of one compound. As to the substrates in the first and third steps, not only free alcohols but also any enzymatically acceptable 21-acylate thereof are equally applicable, the enzymatically acceptable 21-acylate being the corresponding formate, acetate, cathylate or the like, which is capable of being utilized as substrate by the enzyme used. The reaction products can be isolated in conventional manner and simple modification of alcohol group at 21-position by ordinary acylation or the like may be applied in order to facilitate isolation.

The said isomerization from 18,20-hemiketal form to the corresponding 11,18-intramolecular ether form in the second step is carried out using an acid or a mixture of an acid and an acylating agent of enzymatically acceptable acyl moiety, wherein the enzymatically acceptable acyl is as above defined. As to the said acid, any organic or inorganic acid, for example acetic acid, formic acid, propionic acid, oxalic acid, tartaric acid, benzoic acid, p-toluenesulfonic acid, or the like and hydrochloric acid, sulfuric acid, phosphoric acid or the like, may equally be used when an aqueous medium is applied. However, in the absence of aqueous medium, the acids are limited to the group bearing the said enzymatically acceptable acyl moiety, because they act simultaneously as the acylating agent and introduce the said acyl moiety in 21-position of the product (5). Alternatively, in the presence of the particular acylating agent of enzymatically acceptable acyl moiety, for example, acyl halide or anhydride such as formic acid, ethoxyformyl chloride, acetyl chloride, acetic anhydride or the like, any acid is applicable. Any inert solvent can be applied in the treatment. Ratio in yields of the products (5) and 21-acylate thereof vary in accordance with amounts of the acid, acylating agent and, in some cases, the inert solvent inclusive of water. Generally speaking, a treatment with an acid in aqueous medium affords exclusively the free alcoholic product and a treatment with an acylating agent without using aqueous medium affords predominantly the acylate.

The reaction may be carried out by dissolving the substrate in the acid or a mixture of the acid and the acylating agent with or without using the inert solvent, inclusive of water, and maintaining at from about 0° C. to reflux temperature, optionally with stirring in non-oxidative atmosphere such as nitrogen. The reaction may be accomplished in a short period, generally about 10 minutes to 3 days. The reaction mixture may be treated in the conventional manner and simple transformation between free form and acylate form may be utilized for facilitating isolation and purification of the products therein.

The conversion into the 18-hydroxycorticosterone 18, 20-hemiketals (3) may be carried out in the presence of any acid (probably through the free amonomeric 18-hydroxycorticosterone) by the action of alkylating agent or ketalating agent (to fix the 18,20-hemiketal structure). The reaction proceeds easily with the conventional acid and alkylating agent such as an alcohol (e.g. methanol, ethanol or the like) or ketalating agent such as a ketone (e.g. acetone or the like) by keeping at room temperature or higher for a time up to several hours. If required the transformation may be followed by conventional acylation in the presence of basic catalyst for introducing 21-acyl group such as acetyl or the like.

Specific embodiments are illustrated below to aid in understanding of the essence of the present invention.

EXAMPLE 1

(a) Into an aqueous solution (pH 6.8–7.0) containing 3.5% of glucose, 2% of peptone and 0.3% of corn steep liquor, there is inoculated *Corynespora cassiicola* (IMI 56007) and cultured for 4 days at 28° C. with shaking to afford wet mycelium (6.5 g./100 ml. of broth). The resultant wet mycelium is washed with water and suspended in distilled water in the ratio of 6.5 g./100 ml. Corticosterone (5.6 g.) is added to the resultant resting mycelium suspension in the ratio of 70 mg./100 ml. and cultured for 48 hours at 28° C. with shaking.

The reaction mixture is treated in a conventional manner to extract the products with ethyl acetate and evaporated. The resultant extract residue is dissolved in a small amount of chloroform-methanol mixture (1:1) and the solution is diluted with acetone, then allowed to cool to yield crystalline 18-hydroxycorticosterone 18,20-hemiketal dimer (3) (1.6 g.).

The mother liquor is evaporated and the resultant residue is chromatographed over diatomaceous earth (Celite, Hyflo Super Cel, etc.). From the eluate of hexane-benzene mixture (3:7) the same 18-hydroxycorticosterone 18,20-hemiketal dimer (3) (0.08 g.), from the front eluate of benzene 8β-hydroxycorticosterone (0.28 g.), from the middle eluate of benzene 14α-hydroxycorticosterone (0.11 g.), from the rear eluate of benzene 17α-hydroxycorticosterone (0.17 g.), from the front eluate of benzene-chloroform mixture (1:1) 6β-hydroxycorticosterone (0.16 g.), and from the rear eluate of the same solvent system 15β-hydroxycorticosterone (0.56 g.) are respectively obtained as crystals.

18-hydroxycorticosterone 18,20-hemiketal dimer (3): M.P. 293–296° C., $[\alpha]_D^{25}$ +206.5° (in chloroform-methanol mixture (1:1)).

IR: $\nu_{max.}^{Nujol}$ 3458, 1668, 1616 cm.$^{-1}$

Analysis.—Calcd. for $C_{42}H_{56}O_8 \cdot \frac{1}{2}H_2O$ (percent): C, 72.31; H, 8.17. Found (percent): C, 72.08; H, 8.02. Molecular weight. Calcd.: 697; Found: 679.

8β-hydroxycorticosterone: M.P. 213–215° C., $[\alpha]_D^{26.5}$ +226.7° (in chloroform containing 1% of ethanol).

UV: $\lambda_{max.}^{95\% EtOH}$ 242 mμ ($\epsilon$=16000)

IR: $\nu_{max.}^{Nujol}$ 3460, 3352, 1709, 1666, 1625 cm.$^{-1}$

Analysis.—Calcd. for $C_{21}H_{30}O_5$ (percent): C, 69.58; H, 8.34. Found (percent): C, 69.66; H, 8.37.

14α-hydroxycorticosterone: M.P. 213–215° C., $[\alpha]_D^{25.5}$ +196.5° (in methanol).

UV: $\lambda_{max.}^{95\% EtOH}$ 243 mμ ($\epsilon$=16100)

IR: $\nu_{max.}^{Nujol}$ 3438, 1705, 1651, 1619 cm.$^{-1}$

Analysis.—Calcd. for $C_{21}H_{30}O_5$ (percent): C, 69.58; H, 8.34 Found (percent): C, 69.58; H, 8.35.

17α - hydroxycorticosterone (hydrocortisone): M.P. 212–215° C., $[\alpha]_D^{23}$ +160° (in ethanol).

IR: $\nu_{max.}^{Nujol}$ 3472, 1715, 1645, 1613 cm.$^{-1}$

Analysis.—Calcd. for $C_{21}H_{30}O_5$ (percent): C, 69.58; H, 8.34. Found (percent): C, 69.41; H, 8.30.

6β - hydroxycorticosterone: M.P. 225–228° C., $[\alpha]_D^{26.5}$ +128.8° (in dioxane).

UV: $\lambda_{max.}^{95\% EtOH}$ 237.5 mμ ($\epsilon$=14800)

IR: $\nu_{max.}^{Nujol}$ 3420, 1704, 1661, 1615 cm.$^{-1}$

Analysis.—Calcd. for $C_{21}H_{30}O_5$ (percent): C, 69.58; H, 8.34. Found (percent): C, 69.61; H, 8.35.

15β-hydroxycorticosterone: M.P. 240–243° C., $[\alpha]_D^{24.5}$ +158° (in dioxane).

UV: $\lambda_{max.}^{95\% EtOH}$ 243 mμ ($\epsilon$=16600)

IR: $\nu_{max.}^{Nujol}$ 3380, 1701, 1660, 1616 cm.$^{-1}$

Analysis.—Calcd. for $C_{21}H_{30}O_5$ (percent): C, 69.58; H, 8.34 Found (percent): C, 69.27; H, 8.45.

Positions and configurations of the newly introduced hydroxyl groups in these products have been confirmed by the method described in Steroids 4, 713 (1964).

(b) 18-hydroxycorticosterone 18,20-hemiketal dimer (3) (100 mg.) is dissolved in glacial acetic acid (100 ml.) and the resulting solution is refluxed for 70 minutes. The reaction mixture is diluted with water (200 ml.) and extracted with chloroform. The chloroform extract is washed with dilute aqueous sodium bicarbonate solution and water in order, dried over anhydrous sodium sulfate, and concentrated under reduced pressure. The resultant residue is chromatographed over thin-layer of silica gel (Kiesel gel GF, etc.) with ethyl acetate. Polar fraction is extracted to afford 21-hydroxy-11β,18-epoxy-4-pregnene-3,20-dione (18-deoxyaldosterone: 9.8 mg.). Non-polar fraction is further developed with second solvent (chloroform-methanol=19:1) to afford separately 18-deoxyaldosterone 21-acetate (61 mg.) and 11β,18-dihydroxy-4-androstene-17β-carboxylic acid 18,20-lactone (10 mg.).

18-deoxyaldosterone: M.P. 140–141° C., $[\alpha]_D^{25}$ +218° (in chloroform contating 1% of ethanol).

UV: $\lambda_{max.}^{95\% EtOH}$ 240.5 mμ ($\epsilon$=15800)

IR: $\nu_{max.}^{CHCl_3}$ 3500, 1712, 1665, 1621 cm.$^{-1}$

Analysis.—Calcd. for $C_{21}H_{28}O_4$ (percent): C, 73.23; H, 8.19. Found (percent): C, 72.99; H, 8.32.

18-deoxyaldosterone 21-acetate, which is also obtainable by the conventional acetylation of 18-deoxyaldosterone with acetic anhydride in pyridine: M.P. 160–161° C., $[\alpha]_D^{25}$ +216.4° (in chloroform containing 1% of ethanol).

UV: $\lambda_{max.}^{95\% EtOH}$ 240 mμ ($\epsilon$=16400)

IR: $\nu_{max.}^{CHCl_3}$ 1751, 1728, 1667, 1619 cm.$^{-1}$

Analysis.—Calcd. for $C_{23}H_{30}O_5$ (percent): C, 71.48; H, 7.82. Found (percent): 71.26; H, 7.82. This substance is hydrolyzed according to the conventional manner using potassium carbonate in an aqueous methanol medium at room tempertaure to afford the corresponding free alcohol in almost quantitative yield.

11β,18-dihydroxy-4-androstene - 17β - carboxylic acid 18,20-lactone: M.P. 263–265° C., $[\alpha]_D^{24}$ +154.3° (in chloroform containing 1% of ethanol).

UV: $\lambda_{max.}^{95\% EtOH}$ 241.5 mμ ($\epsilon$=16500)

IR: $\nu_{max.}^{KBr}$ 3406, 1770, 1645, 1620 cm.$^{-1}$

Analysis.—Calcd. for $C_{20}H_{26}O_4$ (percent): C, 72.70; H, 7.93. Found (percent): C, 72.74; H, 7.87. This substance is also obtained by sodium bismuthate oxidation of 18-hydroxycorticosterone 18,20-hemiketal dimer (3).

(c) According to the same procedure as in (a), 18-deoxyaldosterone (200 mg.) is hydroxylated by the action of resting mycelium of Corynespora cassiicola (IMI 56007) in water in the concentration 25 mg./100 ml.

The reaction mixture is extracted with ethyl acetate in the conventional manner. The extract (180 mg.) is chromatographed over thin-layer of silica gel (Kieselgel GF, etc.) with chloroform-methanol (8:1) mixture. Polar fraction is extracted to afford aldosterone (34 mg.). Non-polar fraction is re-chromatographed with the second solvent ethyl acetate and, thereby, 18-dehydroaldosterone (4.1 mg.) and 9α-hydroxy-11β.18-epoxy-4-androstene-3,17-dione (3.1 mg.) are separately obtained.

Aldosterone: M.P. 165–167° C., $[\alpha]_D^{24}$ +163.3° (in chloroform containing 1% of ethanol).

UV: $\lambda_{max.}^{95\% EtOH}$ 240.5 mμ ($\epsilon$=16600)

IR: $\nu_{max.}^{CHCl_3}$ 3721, 3571, 3461, 1705, 1667, 1618 cm.$^{-1}$

Analysis.—Calcd. for $C_{21}H_{28}O_5$ (percent): C, 69.97; H, 7.83. Found (percent): C, 69.85; H, 7.76.

Aldosterone 21-acetate, which is obtained by the conventional acetylation of aldosterone with acetic anhydride in pyridine: M.P. 192–194° C. $[\alpha]_D^{23.5}$ +127.5° (in chloroform containing 1% of ethanol).

IR: $\nu_{max.}^{CHCl_3}$ 3711, 3591, 3431, 1738 1718, 1666, 1617 cm.$^{-1}$

Analysis.—Calcd. for $C_{23}H_{30}O_6$ (percent): C, 68.63; H, 7.51. Found (percent): C, 69.07; H, 7.74.

18-dehydroaldosterone, which is also obtainable by chromium trioxide oxidation of aldosterone in pyridine: M.P. 208–213° C.

IR: $\nu_{max.}^{CH_2Cl_2}$ 3486, 1772, 1710, 1671, 1621 cm.$^{-1}$

Analysis.—Calcd. for $C_{21}H_{26}O_5$ (percent): C, 70.37; H, 7.31. Found (percent): C, 69.98; H, 7.19.

18-dehydroaldosterone 21-acetate, which is obtained by the conventional acetylation of 18-dehydroaldosterone with acetic anhydride in pyridine or by oxidation of aldosterone 21-acetate with chromium trioxide in pyridine: M.P. 202–204° C., $[\alpha]_D^{23.5}$ + 118.4° (in chloroform containing 1% ethanol).

IR: $\nu_{max.}^{CHCl_3}$ 1772, 1750, 1728, 1669, 1621 cm.$^{-1}$

Analysis.—Calcd. for $C_{23}H_{28}O_6$ (percent): C, 68.82; H, 7.16. Found (percent): C, 69.11; H, 7.10.

9α-hydroxy-11β,18-epoxy - 4 - androstene-3,17-dione: M.P. 234–236° C.

UV: $\lambda_{max.}^{95\% EtOH}$ 241 mμ ($\epsilon$=15800)

IR: $\nu_{max.}^{Nujol}$ 3421, 1728, 1659, 1624 cm.$^{-1}$

Analysis.—Calcd. for $C_{19}H_{24}O_4$ (percent): C, 72.12; H, 7.65. Found (percent): C, 72.07; H, 7.49.

EXAMPLE 2

(a) According to the quite similar manner as in Example 1(a), corticosterone 21-acetate (2.8 g.) is hydroxylated by the action of resting mycelium of Corynespora cassiicola (IMI 56007) in water by the concentration 50 mg./100 ml., the reaction mixture is treated, and the crude products are separated into the same individual products: 18-hydroxycorticosterone 18,20-hemiketal dimer (3), 0.81 g.; 8β-hydroxycorticosterone, 0.15 g.; 14α-hydroxycorticosterone, 0.05 g.; hydrocortisone, 0.06 g. and 15β-hydroxycorticosterone, 0.11 g.

18-hydroxycorticosterone 18,20-hemiketal dimer (3) (100 mg.) is dissolved in a mixture of methanol (40 ml.) and chloroform (10 ml.). The solution is, after addition of 2 N-hydrochloric acid acid (6 ml.), left at room temperature for 3 hours. The reaction mixture is diluted with water, neutralized with an aqueous sodium bicarbonate solution, extracted with chloroform, and the resultant crude product is chromatographed over a thin-layer of silica gel (Kieselgel GF, etc.) with chloroform-methanol mixture (19:1). Polar fraction is extracted and affords amorphous powdery methyl hemiketal (18-hydroxycorticosterone 18,20-hemiketal 20-methyl ether, 70 mg.).

18-hydroxycorticosterone 18,20-hemiketal 20-methyl ether:

IR: $\nu_{max.}^{Nujol}$ 3410, 1660, 1617 cm.$^{-1}$

N.M.R. (CDCl₃): 8.59, 6.80τ.

To a solution of 18-hydroxycorticosterone 18,20-hemiketal dimer (3) (70 mg.) in acetone (6 ml.), there is added 4 N sulfuric acid (0.1 ml.) to produce crystalline precipitates. After aging for 10 minutes, the resultant crystals are collected by filtration and the mother liquor is, after neutralization with aqueous sodium bicarbonate solution, extracted with chloroform. The crude products are combined and chromatographed over a thin-layer of silica gel (Kieselgel GF, etc.) by development with a solvent system consisting of chloroform-methanol (19:1). From polar adsorption band 18-hydroxycorticosterone dimer (3) (10 mg.) and from non-polar adsorption band 18 - hydroxycorticosterone 18,20 - hemiketal 20-methyl tonide (6.6 mg.) are respectively obtained as crystals.

18 - hydroxycorticosterone 18,20 - hemiketal 20,21-acetonide: M.P. 230–233° C., $[\alpha]_D^{26}$ +212° (in chloroform containing 1% of ethanol).

IR: $\nu_{max.}^{Nujol}$ 3374, 1657, 1613 cm.$^{-1}$

Analysis.—Calcd. for $C_{24}H_{34}O_5$ (percent): C, 71.61; H, 8.51. Found (percent): C, 71.89; H, 8.44.

18 - hydroxycorticosterone 18,20-hemiketal 20-methyl ether (70 mg.) is acetylated by the conventional manner, keeping in a mixture of acetic anhydride (3 ml.) and pyridine (5 ml.) at room temperature for 18 hours. The reaction mixture is evaporated under reduced pressure and the resultant residue is chromatographed over a thin-layer of silica gel (Kieselgel GF, etc.) with chloroform-methanol (19:1). The main fraction is extracted to afford corresponding 21-monoacetate (52 mg.).

18 - hydroxycorticosterone 18,20-hemiketal 20-methyl ether 21-acetate; M.P. 185–187° C. $[\alpha]_D^{28}$ +169.7° (in chloroform containing 1% of ethanol).

UV: $\lambda_{max.}^{95\% EtOH}$ 242.5 mμ ($\epsilon$=16400)

IR: $\nu_{max.}^{Nujol}$ 3396, 1739, 1643, 1617 cm.$^{-1}$

Analysis.—Calcd. for $C_{24}H_{34}O_6$ (percent): C, 68.87; H, 8.19. Found (percent): C, 68.76; H, 8.32.

(b) 18-hydroxycorticosterone 18,20-hemiketal dimer (3) (60 mg.) is dissolved in 50% acetic acid (120 ml.) and refluxed for 90 minutes. The reaction mixture is treated in the same manner as described in Example 1(b), thereby the same products are obtained. 18-deoxyaldosterone, 36.5 mg.; 18-deoxyaldosterone acetate, 6.1 mg. and 11β,18-dihydroxy-4-androstene-17β-carboxylic acid, 18,20-lactone, 5.7 mg.

Respective runs with 18-hydroxycorticosterone 18,20-hemiketal 20-methyl ether, 18-hydroxycorticosterone 18, 20 - hemiketal 20,21 - acetonide and 18 - hydroxycorticosterone 18,20-hemiketal 21-acetate of the equivalent amount to the 18-hydroxycorticosterone 18,20-hemiketal dimer used above afford similar results.

(c) According to the quite similar procedure as described in (a), 18-deoxyaldosterone 21-acetate (100 mg.) is hydroxylated by the action of resting mycelium of *Corynespora cassiicola* (IMI 56007) in water in the concentration of 50 mg./100 ml. The reaction mixture is extracted with ethyl acetate and the resultant extract is chromatographed over a thin-layer of silica gel (Kieselgel GF, etc.) with chloroform-methanol mixture (19:1) to yield quite similar results: aldosterone, 19 mg., 18-dehydroaldosterone, 1.0 mg. and 9α-hydroxy-11β,18-epoxy-4-androstene-3,17-dione, 0.8 mg.

EXAMPLE 3

(a) In a manner quite similar to that of Example 1(a), corticosterone (100 mg.) is hydroxylated by the action of resting mycelium of *Corynespora melonis* (Cke) Lindau (12 g.) is distilled water (100 ml.) for 48 hours with shaking, the reaction mixture is extracted with ethyl acetate and the resultant extract is analogously treated, whereby quite simlar result is obtained: 18-hydroxycorticosterone dimer (3), 21%; 8β-hydroxycorticosterone, 3.8%; 14α-hydroxycorticosterone, 1.1%; 17α-hydroxycorticosterone, 1.8%; 6β-hydroxycorticosterone, 1.2%; and 15β-hydroxycorticosterone, 6.0% in yield.

(b) 18-hydroxycorticosterone 18,20-hemiketal dimer (3) (500 mg.) is dissolved in a mixture of glacial acetic acid (480 ml.) and acetic anhydride (20 ml.). The resultant solution is, after addition of p-toluenesulfonic acid (8 g.), left at room temperature for 20 hours. The reaction mixture is diluted with water (1 liter), extracted with chloroform and the extract is crystallized from acetone-ether mixture to afford 18-deoxyaldosterone acetate (351.5 mg.). The mother liquor is evaporated and the resultant residue is treated with thin-layer chromatography in a similar manner to the Example 1(b), thereby further crop of 18-deoxyaldosterone acetate (56.5 mg.) and 18-deoxyaldosterone (25 mg.) are obtained.

Alternatively, a treatment of 18-hydroxycorticosterone 18,20-hemiketal dimer (20 mg.) with a mixture of glacial acetic acid (20 ml.) and p-toluenesulfonic acid (200 mg.) at room temperature for 20 hours followed by similar treatment as above gives similar result: 18-deoxyaldosterone, 2.2 mg. and 18-deoxyaldosterone acetate, 14.1 mg.

(c) In a manner quite similar to that of Example 1(c), 18-deoxyaldosterone (20 mg.) is hydroxylated by the action of resting mycelium of *Corynespora melonis* (Cke) Lindau (10 g.) in distilled water (100 ml.) for 48 hours with shaking, the reaction mixture is extracted with ethyl acetate and the resultant crude product is chromatographed over a thin-layer of silica gel to afford respective spots showing the presence of aldosterone, 18-dehydroaldosterone and 9α - hydroxy - 11β,18 - epoxy - 4-androstene-3,17-dione.

EXAMPLE 4

(a) Aqueous solution of 3.5% glucose, 2% peptone, 0.3% corn steep liquor, adjusted with 30% sodium hydroxide to pH 7, is added with 1 ml. defoaming agent and sterilized. Twenty liters of the solution is inoculated with *Corynespora cassiicola* (IMI 56007) and propagated at 27–28° C. for 42 hours with aeration and stirring. The broth is centrifuged and mycelium is washed with water. The mycelium is suspended in 20 liters water, added with 14 g. corticosterone in 300 ml. methanol, and the mixture is stirred and aerated at 27–28° C. for 47.5 hours. The mixture is filtered and the filtrate is extracted with ethyl acetate. The extract solution is dried and evaporated in vacuo. The product is 18-hydroxycorticosterone dimer (3) and a few grams of the isomers.

(b) A solution of 8.803 g. 18-hydroxycorticosterone dimer (3) in 880 ml. acetic acid is added with 13.2 g. p-toluenesulfonic acid hydrate and 41 ml. acetic anhydride, and the mixture is left at room temperature overnight. The reaction mixture is poured into 1.6 liters water, extracted with chloroform. The organic layer is washed and dried and evaporated to obtain 10.376 g. residue, which is recrystallized from acetone-ether to afford 7.338 g. of 18-deoxyaldosterone 21-acetate, M.P. 165–167.5° C. Yield: 74.78%. Purification of the mother liquor raised the yield up to 96%.

(c) Aqueous solution of 3.5% glucose, 2% peptone, 0.3% corn steep liquor, adjusted with 30% sodium hydroxide to pH 7, is added with 1 ml. defoaming agent and sterilized. Twenty liters of the solution is inoculated with *Corynespora Cassiicola* (IMI 56007) and propagated at 27–28° C. for 42 hours with aeration and stirring. The broth is centrifuged and mycelium is washed with water. The mycelium is suspended in 20 liters water, added with 5 g. 18-deoxyaldosterone 21-acetate, and the mixture is stirred and aerated at 27–28° C. for 20 hours. The mixture is filtered, and the filtrate is extracted with ethyl acetate. The extract is dried and evaporated in vacuo and purified by chromatography and recrystallization to obtain 1.408 g. aldosterone, M.P. 168–170° C. Yield: 30.13%.

What we claim is:

1. A process for preparing aldosterone, 18-dehydroaldosterone or 9α-hydroxy - 11β,18-epoxy-4-androstene-3,17-dione, which comprises treating corticosterone or an enzymatically acceptable 21-acylate thereof with the enzymes of a Corynespora fungus, treating the resultant compound of the formula:

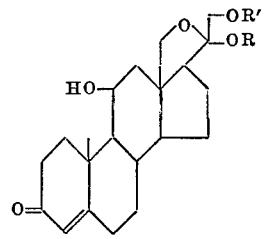

wherein R solely represents a lower alkyl, R' solely represents a hydrogen atom or a lower alkanoyl, or R and R' combined together represent a lower alkylidene or another molecule of the same 18-hydroxycorticosterone 18,20-hemiketal ($C_{21}H_{28}O_3$) moiety, with an acid or a mixture of an acid and an acylating agent of enzymatically acceptable acyl moiety, and treating the resultant 18-deoxyaldesterone or an enzymatically acceptable 21-acylate thereof with the enzymes of a Corynespora fungus.

2. A process for preparing aldosterone, 18-dehydroaldosterone or 9α-hydroxy-11β,18-epoxy-4-androstene-3,17-dione, which comprises treating 18-deoxyaldosterone or an enzymatically acceptable 21-acylate thereof with the enzymes of a Corynespora fungus.

3. A process claimed in claim 2, wherein the treatment is carried out in a nutrient-deficient or nutrient-lacking medium at enzymatically optimum temperature for about 1–5 days.

4. A process claimed in claim 2, wherein the treatment is carried out in water at about 15–40° C. for about 1–5 days with resting mycelium of a Corynespora fungus.

5. A process claimed in claim 2, wherein the treatment is carried out with the starting material selected from 18-deoxyaldosterone and 21-acetate thereof, in water at about 15–40° C. for about 1–5 days with resting mycelium of a Corynespora fungus selected from *C. melonis* and *C. cassiicola*.

6. A process for preparing 18-hydroxycorticosterone 18,20-hemiketal dimer accompanied with or without byproduction of 6β-, 8β-, 14α-, 15β- and 17α-monohydroxycorticosterones, which comprises treating corticosterone or an enzymatically acceptable 21-acylate thereof with the enzymes of a Corynespora fungus.

7. A process claimed in claim 6, wherein the treatment is carried out in a nutrient-deficient or nutrient-lacking medium at enzymatically optimum temperature for about 1–5 days.

8. A process claimed in claim 6, wherein the treatment is carried out in water at about 15–40° C. for about 1–5 days with resting mycelium of a Corynespora fungus.

9. A process claimed in claim 6, wherein the treatment is carried out with the starting material, selected from corticosterone and 21-acetate thereof, in water at about 15–40° C. for about 1–5 days with resting mycelium of a Corynespora fungus selected from *C. cassiicola* and *C. melonis*.

10. A process for preparing a compound of the formula:

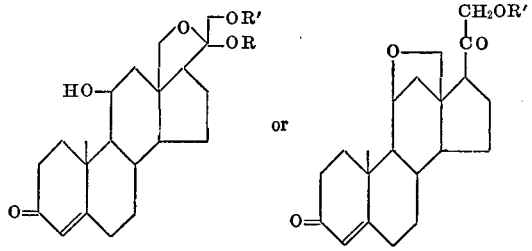

or wherein R solely represents a lower alkyl, R' solely represents a hydrogen atom or a lower alkanoyl, or R and R' combined together represent a lower alkylidene or another molecule of the same 18-hydroxycorticosterone 18,20-hemiketal ($C_{21}H_{28}O_3$) moiety, which comprises treating corticosterone or an enzymatically acceptable 21-acylate thereof with the enzymes of a Corynespora fungus and, if required, treating the resultant product in the presence of an acid with a corresponding alkylating agent or ketalating agent followed by, if required, acylation.

References Cited
UNITED STATES PATENTS 3,000,884  9/1961  Wettstein et al. _____ 195—51 R ALVIN E. TANENHOLTZ, Primary Examiner U.S. Cl. X.R.

260—239.55